(12) United States Patent
Sampsell

(10) Patent No.: US 8,013,831 B2
(45) Date of Patent: *Sep. 6, 2011

(54) METHODS AND DEVICES FOR LIGHTING DISPLAYS

(75) Inventor: Jeffrey B. Sampsell, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/821,070

(22) Filed: Jun. 22, 2010

(65) Prior Publication Data

US 2010/0309103 A1 Dec. 9, 2010

Related U.S. Application Data

(63) Continuation of application No. 11/187,784, filed on Jul. 22, 2005, now Pat. No. 7,750,886.

(60) Provisional application No. 60/613,264, filed on Sep. 27, 2004.

(51) Int. Cl.
*G09G 3/38* (2006.01)

(52) U.S. Cl. ........................ 345/102; 345/204

(58) Field of Classification Search .................. 345/102, 345/204; 455/566
See application file for complete search history.

(56) References Cited

U.S. PATENT DOCUMENTS

| | | |
|---|---|---|
| 5,110,370 A | 5/1992 | Vogeli et al. |
| 5,151,801 A | 9/1992 | Hiroshima |
| 5,261,970 A | 11/1993 | Landis et al. |
| 5,341,242 A | 8/1994 | Gilboa et al. |
| 5,615,024 A | 3/1997 | May et al. |
| 5,712,694 A | 1/1998 | Taira et al. |
| 5,731,857 A | 3/1998 | Neijzen |
| 5,808,708 A | 9/1998 | Oyama et al. |
| 6,008,449 A | 12/1999 | Cole |
| 6,123,431 A | 9/2000 | Teragaki |
| 6,323,415 B1 | 11/2001 | Uematsu et al. |
| 6,359,668 B1 | 3/2002 | Iijima |
| 6,643,067 B2 | 11/2003 | Miyamae |
| 6,657,700 B2 | 12/2003 | Sako et al. |
| 6,741,377 B2 | 5/2004 | Miles |
| 6,819,380 B2 | 11/2004 | Wen et al. |
| 6,853,418 B2 | 2/2005 | Suzuki et al. |
| 6,864,882 B2 | 3/2005 | Newton |

(Continued)

FOREIGN PATENT DOCUMENTS

EP    0 867 747 A2    9/1998

(Continued)

OTHER PUBLICATIONS

Partial European Search Report in EP10176266 dated Dec. 9, 2010.

(Continued)

*Primary Examiner* — Ricardo L Osorio

(74) *Attorney, Agent, or Firm* — Knobbe, Martens, Olson & Bear, LLP

(57) ABSTRACT

Various devices and methods of lighting a display are disclosed. In one embodiment, for example, a display device includes a transmissive display configured to be illuminated through a back surface and a reflective display configured to be illuminated through a front surface. A light source is disposed with respect to the back of the transmissive display to illuminate the transmissive display through the back surface. A light pipe is disposed with respect to the light source to receive light from the light source and is configured to propagate the light such that this light provides front illumination of the reflective display.

29 Claims, 17 Drawing Sheets

U.S. PATENT DOCUMENTS

| | | |
|---|---|---|
| 6,871,982 B2 | 3/2005 | Holman et al. |
| 6,883,924 B2 | 4/2005 | Maeda et al. |
| 6,972,827 B2 | 12/2005 | Mi |
| 7,042,444 B2 | 5/2006 | Cok |
| 7,050,219 B2 | 5/2006 | Kimura |
| 7,123,216 B1 | 10/2006 | Miles |
| 7,133,022 B2 | 11/2006 | Grabert |
| 7,187,489 B2 | 3/2007 | Miles |
| 7,236,663 B2 | 6/2007 | Wakita et al. |
| 7,349,139 B2 | 3/2008 | Chui |
| 7,420,638 B2 | 9/2008 | Tasaka et al. |
| 7,520,642 B2 | 4/2009 | Holman et al. |
| 7,561,323 B2 | 7/2009 | Gally |
| 7,603,001 B2 | 10/2009 | Wang |
| 7,719,747 B2 | 5/2010 | Tung |
| 7,750,886 B2 | 7/2010 | Sampsell |
| 7,766,498 B2 | 8/2010 | Sampsell |
| 2001/0022636 A1 | 9/2001 | Yang et al. |
| 2001/0055076 A1 | 12/2001 | Ochi et al. |
| 2002/0176035 A1 | 11/2002 | Yamazaki |
| 2003/0012009 A1 | 1/2003 | Suzuki |
| 2003/0165067 A1 | 9/2003 | Imamura |
| 2003/0210222 A1 | 11/2003 | Ogiwara et al. |
| 2004/0061946 A1 | 4/2004 | Yoshikawa |
| 2004/0070711 A1 | 4/2004 | Wen |
| 2004/0184134 A1 | 9/2004 | Makigaki |
| 2005/0195175 A1 | 9/2005 | Anderson |
| 2005/0231981 A1 | 10/2005 | Hoelen et al. |
| 2006/0044523 A1 | 3/2006 | Teijido |
| 2006/0114244 A1 | 6/2006 | Saxena |
| 2007/0171418 A1 | 7/2007 | Nyhart |
| 2007/0187852 A1 | 8/2007 | Parker et al. |
| 2009/0126777 A1 | 5/2009 | Khazeni |
| 2009/0225394 A1 | 9/2009 | Chui |
| 2009/0255569 A1 | 10/2009 | Sampsell |
| 2009/0296194 A1 | 12/2009 | Gally |
| 2009/0310208 A1 | 12/2009 | Wang |
| 2009/0323153 A1 | 12/2009 | Sampsell |
| 2010/0182308 A1 | 7/2010 | Holman |

FOREIGN PATENT DOCUMENTS

| | | |
|---|---|---|
| EP | 1 231 757 | 8/2002 |
| EP | 2 040 114 | 3/2009 |
| EP | 2 251 731 | 11/2010 |
| GB | 2 315 356 | 1/1998 |
| GB | 2 336 933 | 3/1999 |
| JP | 57-3266 | 1/1982 |
| JP | 58 115781 | 8/1983 |
| JP | 60 165621 A | 8/1985 |
| JP | 57 3266 | 1/1992 |
| JP | 06-265870 A | 9/1994 |
| JP | 08 050283 A | 2/1996 |
| JP | 10 500224 | 1/1998 |
| JP | 10-096910 | 4/1998 |
| JP | 10 325953 | 12/1998 |
| JP | 11 052887 | 2/1999 |
| JP | 11-052887 | 2/1999 |
| JP | 11 211999 | 8/1999 |
| JP | 11 249132 | 9/1999 |
| JP | 11 316553 | 11/1999 |
| JP | 2000-075287 | 3/2000 |
| JP | 2000 181367 | 6/2000 |
| JP | 2002-014344 | 1/2002 |
| JP | 2002 014344 | 1/2002 |
| JP | 2002 523798 | 7/2002 |
| JP | 2002-229023 | 8/2002 |
| JP | 2003 140118 | 5/2003 |
| JP | 2003 195201 | 7/2003 |
| JP | 2004 070189 | 3/2004 |
| JP | 2004-070189 | 3/2004 |
| JP | 2004 087409 | 3/2004 |
| JP | 2004-126196 | 4/2004 |
| JP | 2004 126196 | 4/2004 |
| JP | 2004 145109 | 5/2004 |
| JP | 2004-219843 A | 8/2004 |
| JP | 2005 031219 | 2/2005 |
| WO | WO 95/15582 A1 | 6/1995 |
| WO | WO 95/30924 | 11/1995 |
| WO | 98 52094 | 11/1998 |
| WO | WO 98/52094 | 11/1998 |
| WO | WO 99/04296 A | 1/1999 |
| WO | 2004 012004 | 2/2004 |
| WO | WO 2004/012004 | 2/2004 |
| WO | WO 2009/129264 | 10/2009 |

OTHER PUBLICATIONS

Extended European Search Report in EP10176261 dated Dec. 8, 2010.

Office Action in Japanese Application No. 2007-533487 mailed Sep. 7, 2010.

Fan et al., "Channel Drop Filters in Photonic Crystals", Optics Express, vol. 3, No. 1, pp. 4-11, 1998.

Little et al., "Vertically Coupled Microring Resonator Channel Dropping Filter", IEEE Photonics Technology Letters, vol. 11, No. 2, pp. 215-217, 1999.

Extended European Search Report in App. No. 08153691.4; Publication No. EP 2068182) dated Mar. 25, 2009.

Extended Search Report in European App. No. 08153690; Publication No. EP 2068181 ) dated Mar. 5, 2009.

International Preliminary Report on Patentability in PCT/US2008/085010; International Pub. No. WO 2009/073555) dated Apr. 12, 2010.

International Search Report and Written Opinion in PCT/US2008/085010; International Pub. No. WO 2009/073555 ) dated Mar. 4, 2009.

International Preliminary Report and Written Opinion in PCT/US2009/040561 dated Oct. 28, 2010.

Office Action in U.S. Appl. No. 11/187,784 dated Oct. 7, 2008.

Amendment and Response in U.S. Appl. No. 11/187,784 dated Nov. 19, 2008.

Office Action in U.S. Appl. No. 11/187,784 dated Feb. 17, 2009.

Amendment and Response in U.S. Appl. No. 11/187,784 dated Mar. 30, 2009.

Notice of Allowance in U.S. Appl. No. 11/187,784 dated Jun. 5, 2009.

RCE and IDS in U.S. Appl. No. 11/187,784 dated Sep. 3, 2009.

Notice of Allowance in U.S. Appl. No. 11/187,784 dated Oct. 21, 2009.

RCE and IDS in U.S. Appl. No. 11/187,784 dated Jan. 20, 2010.

Notice of Allowance in U.S. Appl. No. 11/187,784 dated Feb. 8, 2010.

Amendment under 37 CFR 1.312 in U.S. Appl. No. 11/187,784 dated May 7, 2010.

Response to Amendment under 37 CFR 1.312 in U.S. Appl. No. 11/187,784 dated May 25, 2010.

Official Communication in Chinese Application No. 200580030964.X dated Jun. 6, 2008.

Official Communication in European Application No. 05 791 508.4; Publication No. EP 2040114) dated Jul. 19, 2007.

Official Communication in Japanese Application No. 2007-533487, dated Sep. 7, 2010.

Official Communication in Mexican Application No. MX/a/2007/003594 dated Jun. 18, 2009.

Substantive Examination Report in Malaysian App. No. PI 20054177 dated Apr. 10, 2009.

Substantive Examination Report in Malaysian Patent Application No. PI20054177 dated Dec. 15, 2009.

Official Communication in European Patent Application No. 08 075 318.9 dated Oct. 30, 2009.

Official Communication in Russian Application No. 2007115881 dated Aug. 25, 2009.

Request for Continued Examination (RCE) and Amendment in U.S. Appl. No. 11/952,871, dated Feb. 8, 2010.

Examiner Interview Summary in U.S. Appl. No. 11/952,871, dated Jul. 14, 2010.

Amendment, Applicant Interview Summary, and Information Disclosure Statement (IDS) in U.S. Appl. No. 11/952,871, dated Aug. 24, 2010.

Restriction Requirement in U.S. Appl. No. 11/952,871, dated Nov. 10, 2010.
Official Communication in European Application No. 08153690.6, dated Jan. 19, 2010.
Official Communication in European Application No. 08153691.4, dated Jan. 19, 2010.
Preliminary Amendment in U.S. Appl. No. 12/423,354, dated Aug. 28, 2009.
Notice of Allowance in U.S. Appl. No. 12/423,354, dated Sep. 1, 2010.
Request for Continued Examination (RCE) and Information Disclosure Statement (IDS) in U.S. Appl. No. 12/423,354, dated Sep. 14, 2010.
Office Action issued Mar. 18, 2011 to related Chinese application No. 200910215524.1.

METHODS AND DEVICES FOR LIGHTING DISPLAYS

CROSS REFERENCE TO RELATED APPLICATIONS

This application is a continuation of U.S. application Ser. No. 11/187,784 titled METHODS AND DEVICES FOR LIGHTING DISPLAYS, filed Jul. 22, 2005, which claims priority to U.S. Provisional Application No. 60/613,264 titled METHOD AND DEVICE FOR LIGHTING A DISPLAY, filed Sep. 27, 2004, each of which is incorporated by reference in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

The invention includes display systems and methods of illuminating a display. One embodiment includes a display device that includes a transmissive display including a front surface and a back surface, the transmissive display configured to be illuminated through the back surface, a reflective display comprising a front surface and a back surface, said reflective display configured to be illuminated through the front surface, a light source disposed with respect to the back of the transmissive display to illuminate the transmissive display through the back surface, and a light pipe disposed with respect to the light source to receive light therefrom, said light pipe configured to propagate said light such that said light provides front illumination of said reflective display.

Another embodiment includes a method of illuminating a reflective display and a transmissive display with a light source, the reflective and transmissive displays being positioned in a back-to-back configuration, the method including disposing the light source with respect to a back portion of the transmissive display to illuminate the transmissive display through the back, disposing a light pipe with respect to the light source to receive light therefrom, and disposing the reflective display with respect to the light pipe such that light exiting the light pipe provides front illumination for the reflective display. Yet another embodiment includes a display device manufactured by such a method of illuminating a reflective display and a transmissive display with a light source.

Another embodiment includes a display device, includes a first reflective display including a viewable surface and a back surface, a second reflective display including a viewable surface and a back surface, the back surface of the first display disposed substantially facing the back surface of the second display and positioned near the back surface of the second display, a light source, and light piping coupled to the light source and coupled to an edge or surface of both the first and second displays to transfer light emitted from the light source into a portion of the viewable surface of both the first and second displays illuminating the first and second displays.

Another embodiment includes a microelectromechanical systems (MEMS) display device, including first means for displaying an image, the first means for displaying comprising a front surface and a back surface, means for illuminating the first means for displaying through the back surface, second means for displaying an image comprising a front surface and a back surface, and means for illuminating the second means for displaying through the front surface of the second means for displaying, wherein the means for illuminating the second means for displaying uses light from the means for illuminating the first means for displaying.

DETAILED DESCRIPTION OF CERTAIN EMBODIMENTS

Figure 1:
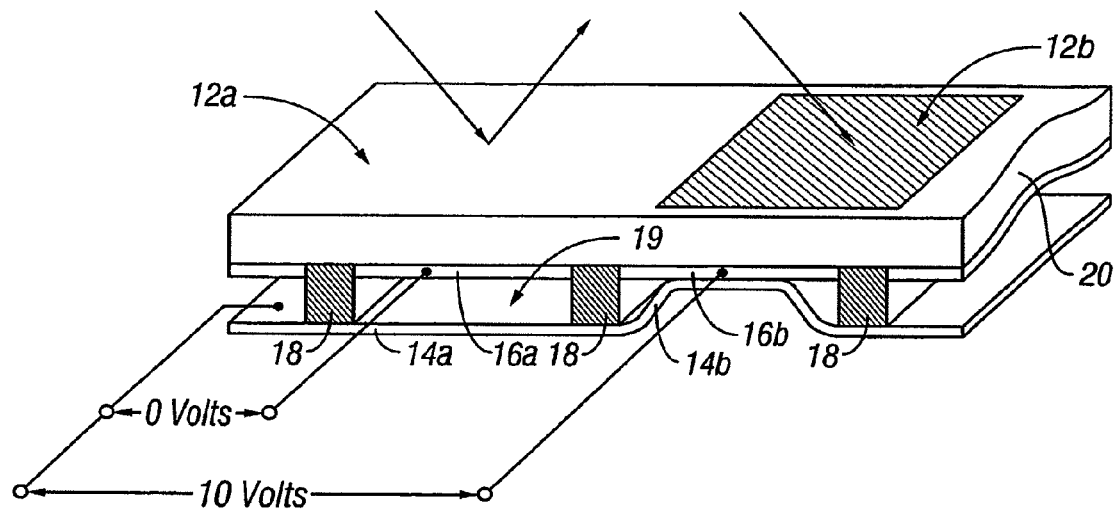
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Various embodiments described herein include devices and methods of lighting a display using a light source and light pipes. In one embodiment, for example, a display includes a transmissive display configured to be illuminated through a back surface and a reflective display configured to be illuminated through a front surface. The display includes a single light source sandwiched between the transmissive display and the reflective display. The light source illuminates the transmissive display through its back surface. A light pipe receives light from the light source and propagates the light so that it illuminates the reflective display through a front surface or edge of the display. Various embodiments of the light pipe and the light source are possible depending on the application of the display.

A cellular phone is an example of a product in which the MEMS device can be used in a display. Cellular phones featuring a "clamshell-like" structure are typically closed when not in use and then opened to receive a telephone call. Such cellular phones do not allow viewing of a principle display located on an interior surface of the clamshell when the phone is closed. Consequently, a second smaller, less sophisticated display, which is sometimes referred to herein as a "sub-display," can be included on an outer surface of the clamshell that is visible when the phone is closed to provide "quick-look" information without requiring a user to open the phone. The principle display and sub-display can be transmissive or transflective LCDs, which use backside illumination. To lower the cost and complexity of the cellular phone and to keep the clamshell as thin as possible, a single backlight placed in-between the principle display and sub-display can be used to illuminate both displays. In one embodiment, the backlight illuminates the principle display through a rear surface of the principle display. The backlight is configured with one or more light-leaking regions on its rear surface that correspond to the area of the sub-display. Light control patterns, for example, patterns on films attached to the backlight or patterns disposed directly on the backlight itself, can be used so that uniformity of light emitted from the front surface of the backlight is not disturbed by the loss of light that leaks out the rear surface to the sub-display.

When the transmissive or transflective sub-display is replaced by a reflective display, e.g., an interferometric modulator (MEMS device), that utilizes frontside illumination, it is more difficult to share the backlight because light exiting the rear surface of the backlight light will hit the opaque back side of the reflective display and provide no useful illumination. One solution is to equip the reflective display with a frontlight. This solution works, but it has several undesirable consequences. First, the extra light adds cost and complexity to the product. Second, a front light increases the thickness of the display and the cell phone incorporating the display, and hence decreases the market desirability of the product.

Methods and systems are described herein include illuminating reflective displays using a single backlight to reduce the size and cost associated with adding an additional front light. Light from the backlight can be channeled with a light pipe to a portion of the reflective display, such as an edge of the display or the front of the display. For example, in a dual display clamshell cellular phone, a backlight provides rear illumination of a transmissive display located on one face of the clamshell, or portion thereof, and simultaneously provides front illumination of a reflective display, such as an interferometric modulator display, located on the opposite face of the clamshell, through light pipe structures. Light pipes may be at least partially incorporated into the backplate of the reflective display, in some embodiments. In certain embodiments, a single light source with one or more light pipes can be used to illuminate reflective displays on both faces of the device.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in. this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
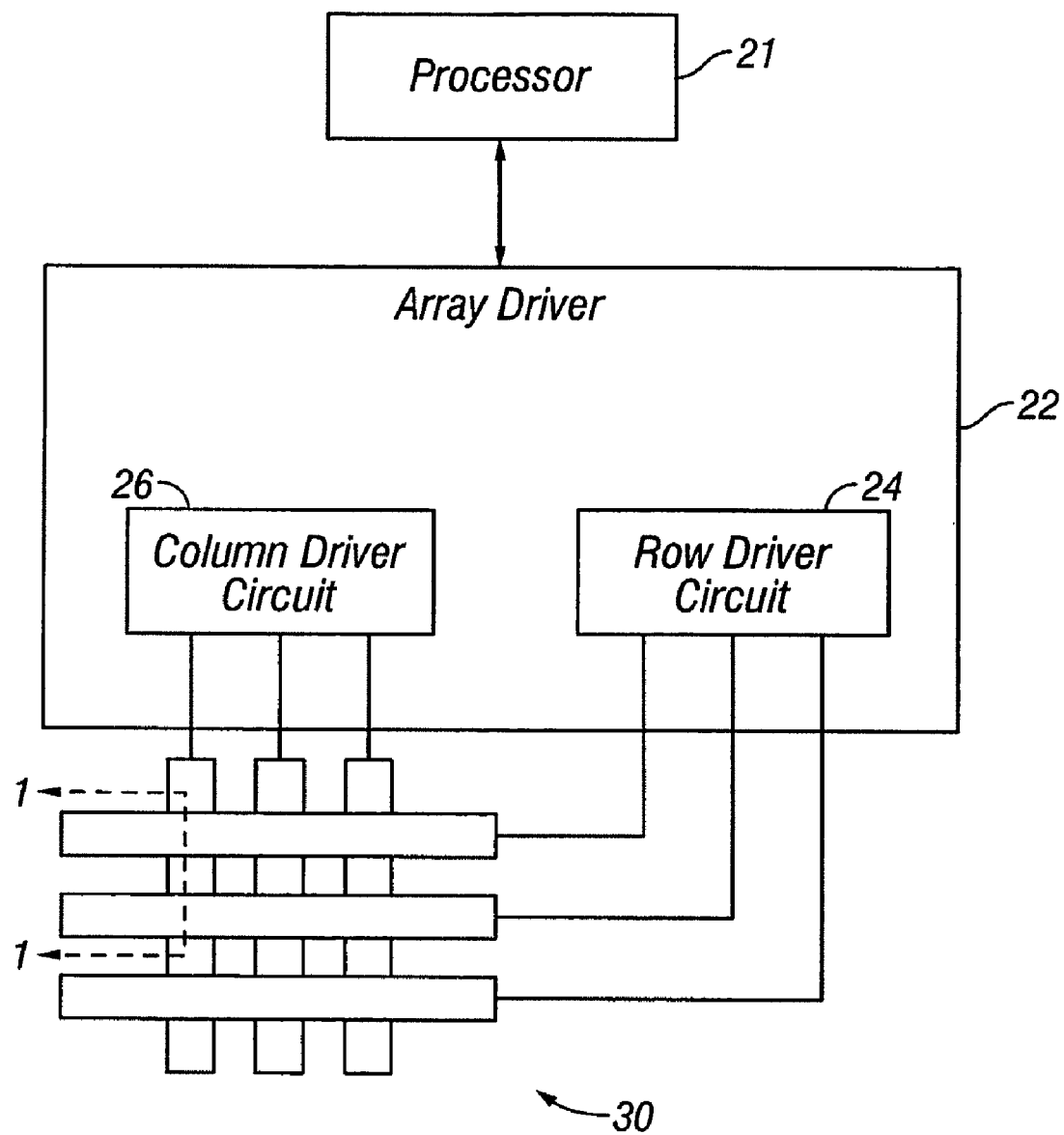
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS , a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
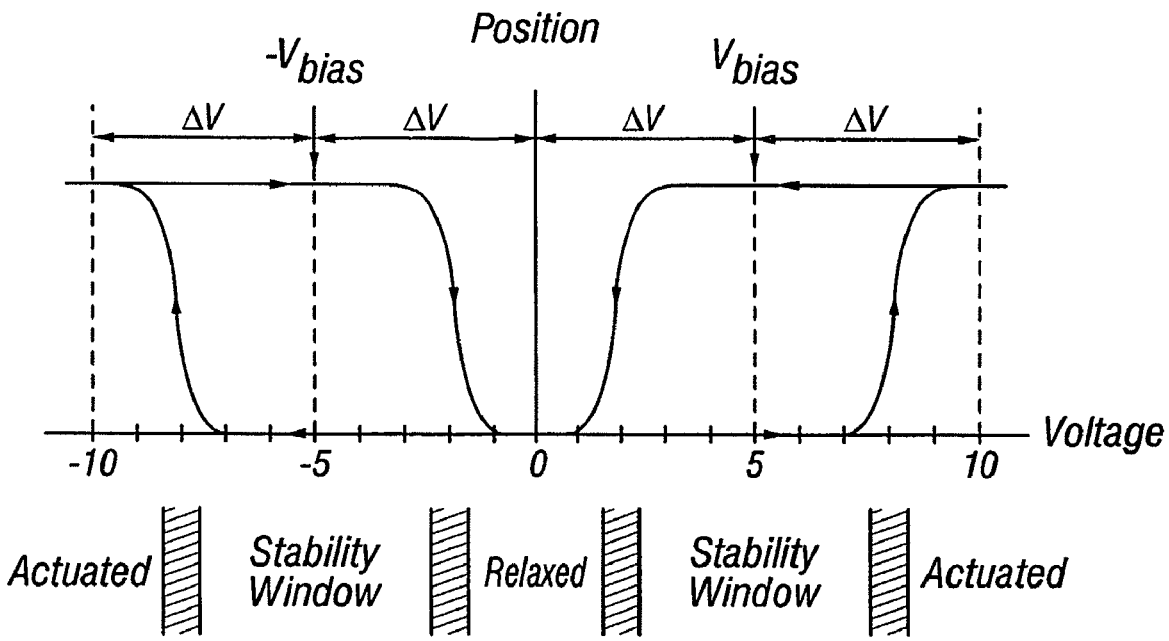
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
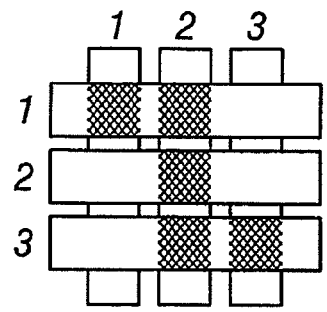
FIG. 5A illustrates one exemplary frame of display data in the 3×3 interferometric modulator display of FIG. 2.
Figure 5B:
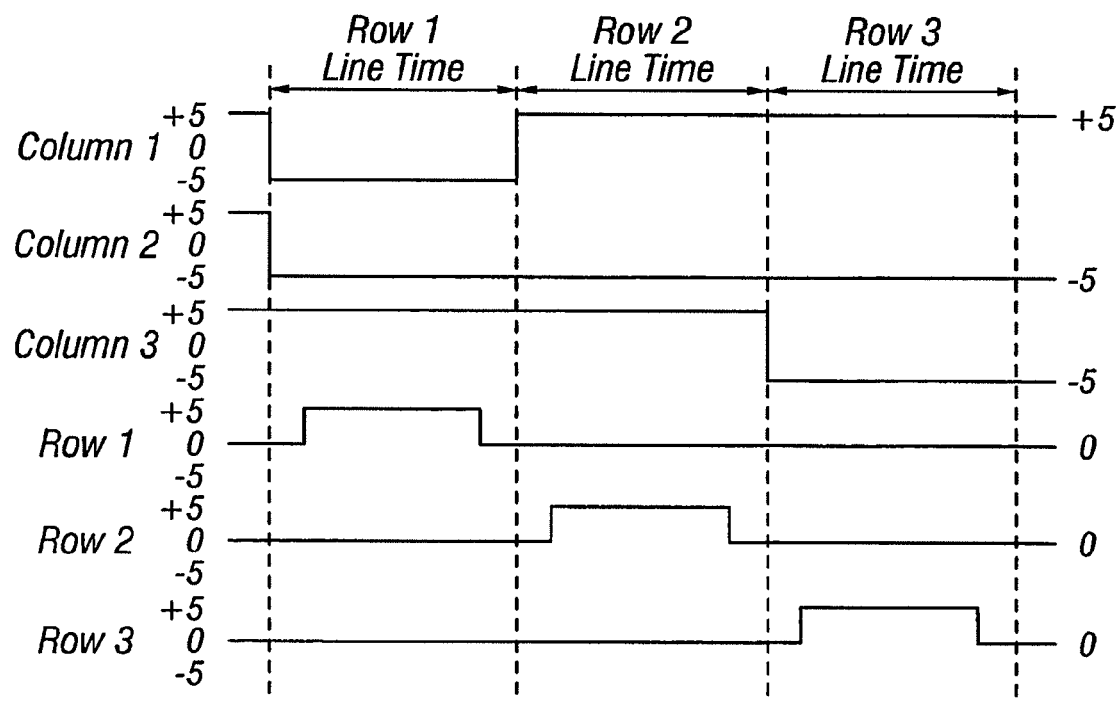
FIG. 5B illustrates one exemplary timing diagram for row and column signals that may be used to write the frame of FIG. 5A.

FIGS. 4, 5A and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
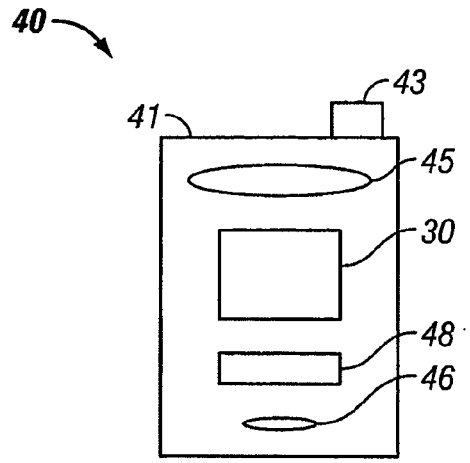
FIGS. 6A and 6B are system block diagrams illustrating an embodiment of a visual display device comprising a plurality of interferometric modulators.
Figure 6B:
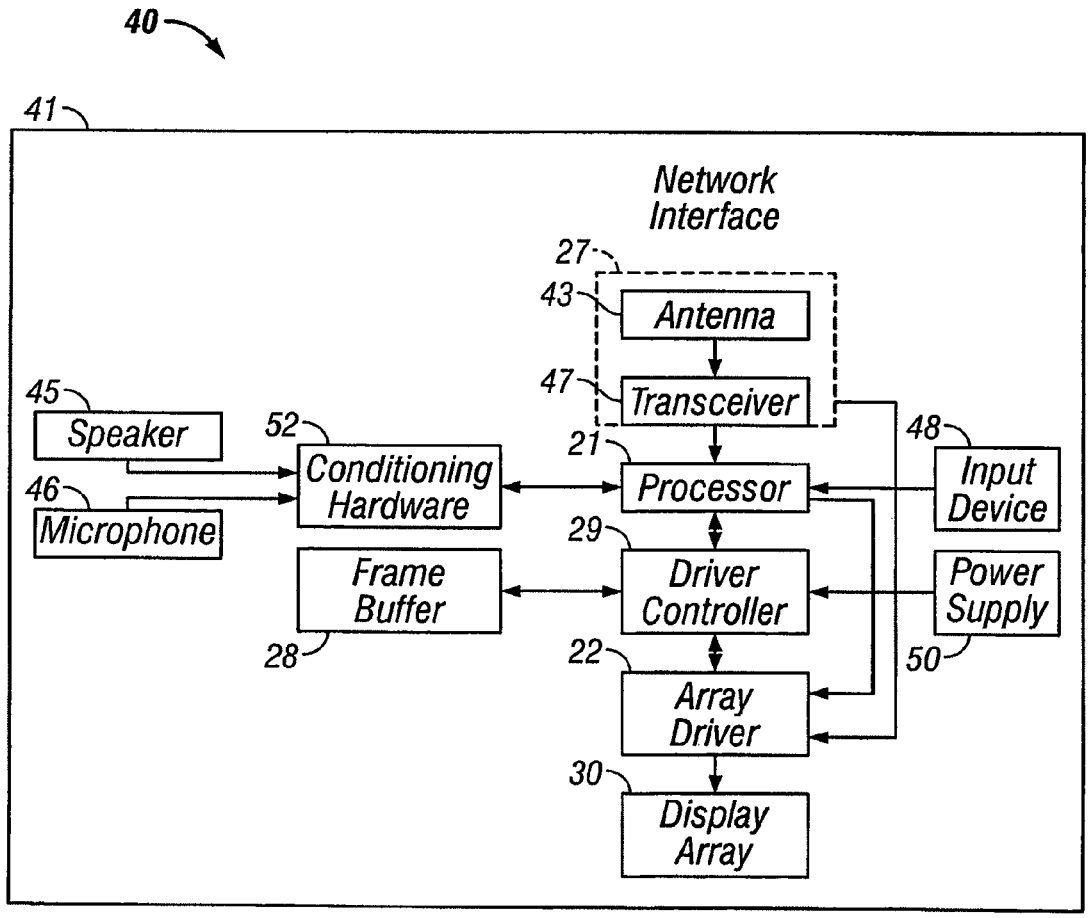

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
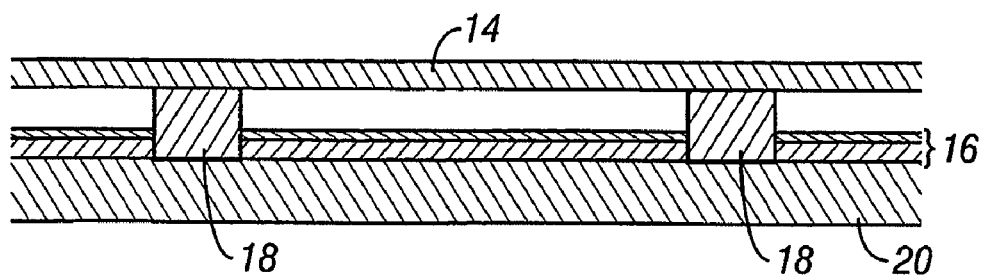
FIG. 7A is a cross section of the device of FIG. 1.
Figure 7B:
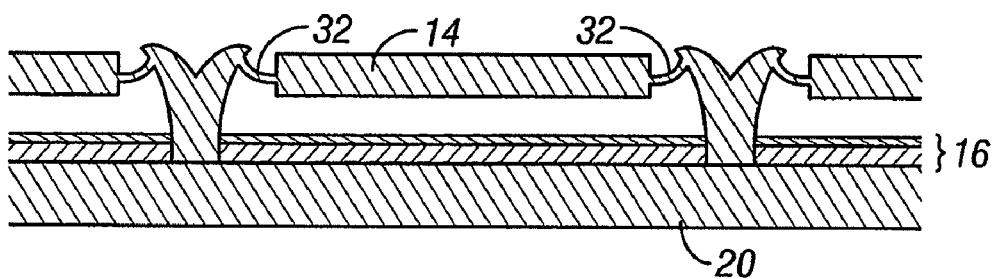
FIG. 7B is a cross section of an alternative embodiment of an interferometric modulator.
Figure 7C:
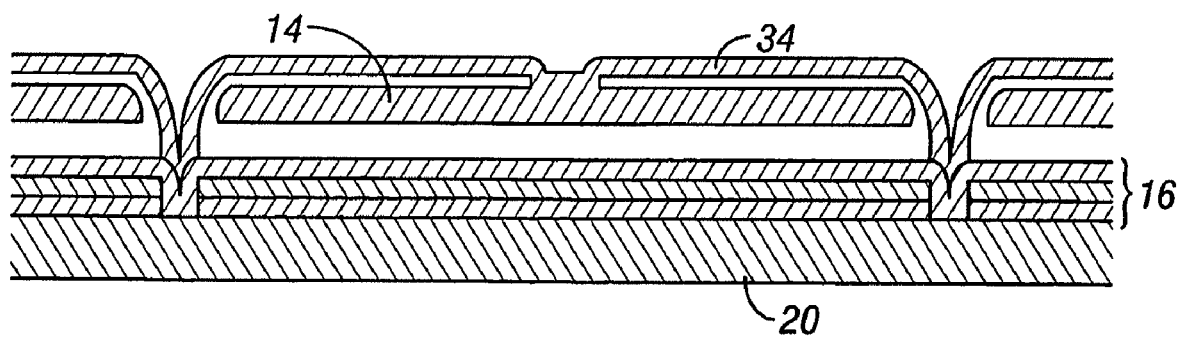
FIG. 7C is a cross section of another alternative embodiment of an interferometric modulator.
Figure 7D:
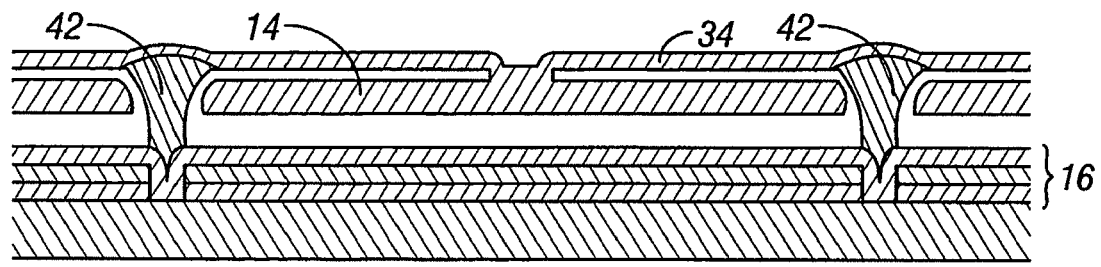
FIG. 7D is a cross section of yet another alternative embodiment of an interferometric modulator.
Figure 7E:
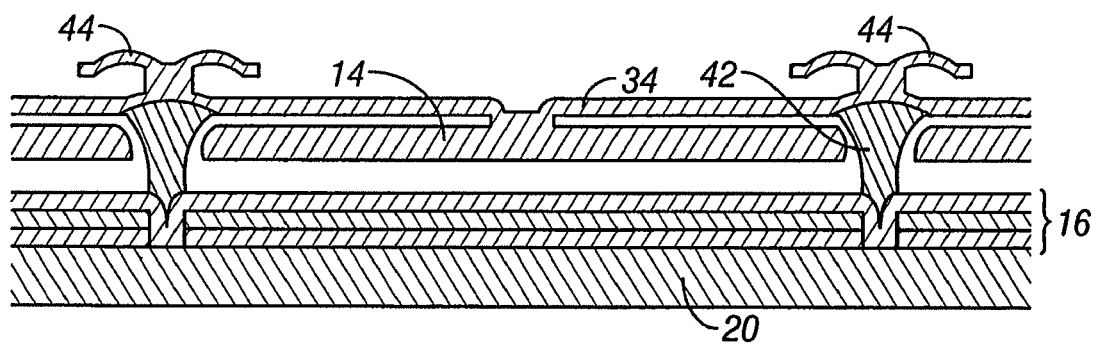
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 7A-7E, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
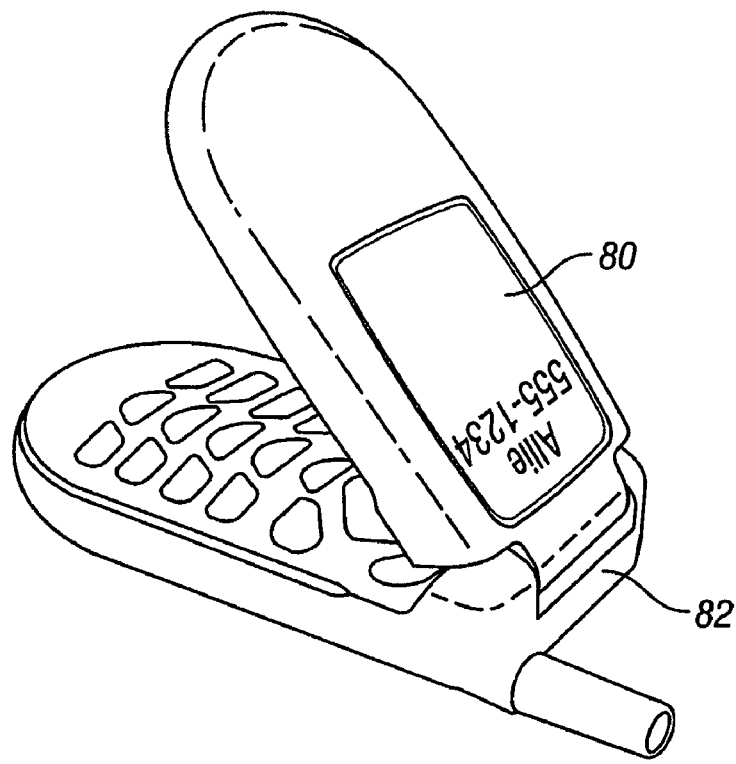
FIG. 8 is a diagram schematically illustrating a mobile phone with a clamshell-like structure that includes a sub-display disposed on an exterior surface of the clamshell.
Figure 9:
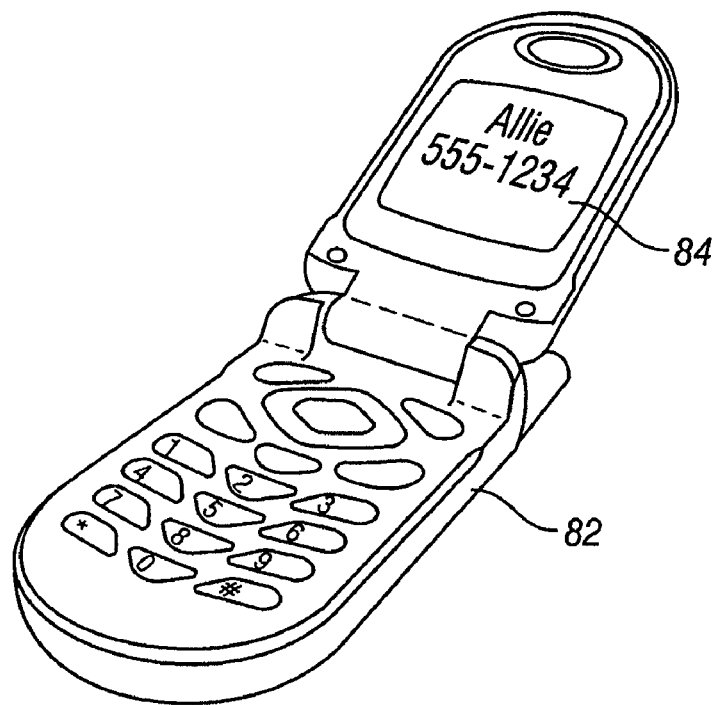
FIG. 9 is a diagram schematically illustrating a mobile phone with a clamshell-like structure that includes a principle display disposed on an interior surface of the clamshell.

Referring to FIGS. 8 and 9, there are many mobile devices, e.g., the "clamshell" cell phone 82, that include a principle display 84 located on an inner surface of one half of the clamshell, and a sub-display 80 located on an outer surface of the same half of clamshell as the principle display 84. Examples of reflective devices which can be used as the principle display 84 and the sub-display 80 include LCD's and interferometric modulators. In the embodiments described herein, the principle display 84 and/or the sub-display 80 can comprise interferometric modulators. If the principle display 84 and the sub-display 80 are both reflective devices, they may benefit from receiving additional illumination when ambient light is not sufficient to view displayed information. Examples of devices for providing additional illumination include light emitting diodes (LEDs), incandescent lamps, and fluorescent lamps. Approaches that are described herein for providing light to the principle display 84 can also be used to provide light to the sub-display 80, and vice-versa.

Figure 10:
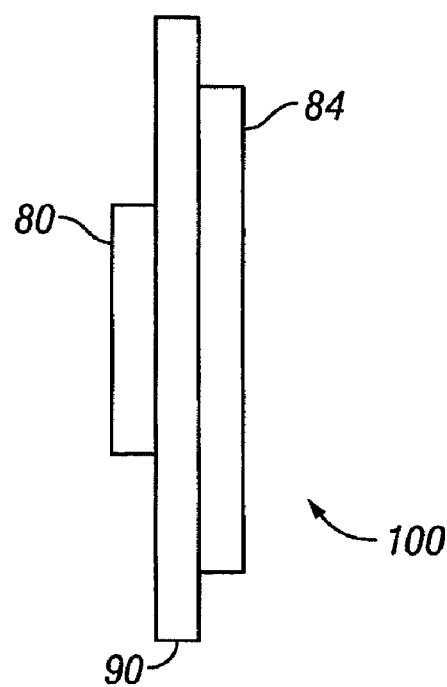
FIG. 10 is a diagram schematically illustrating a cross section of a backlight disposed between a principle display and a sub-display.

FIG. 10 shows one embodiment of a dual display 100 where a backlight light source 90 is used to provide light to a principle display 84 and a sub-display 80. In this embodiment, both the principle display 84 and the sub-display 80 can be, e.g., LCD devices that allow light from the backlight 90 to enter the principle display 84 and the sub-display 80 through the back of the displays by using configured light leaks to the LCD devices. Providing illumination from a common backlight 90 to both displays is efficient when the displays are configurable to allow light to enter the devices from behind, e.g., through a portion of the back panel of the display device. The displays 84 and 80 can also be reflective devices. In such embodiments, the backlight 90 may include light leak areas or channels specifically designed to allow light to propagate directly from the backlight 90 to the front surface of the displays 80, 84 thereby front lighting the displays 84, 80. Other embodiments may incorporate more than one light source to illuminate the displays 84, 80.

Figure 11:
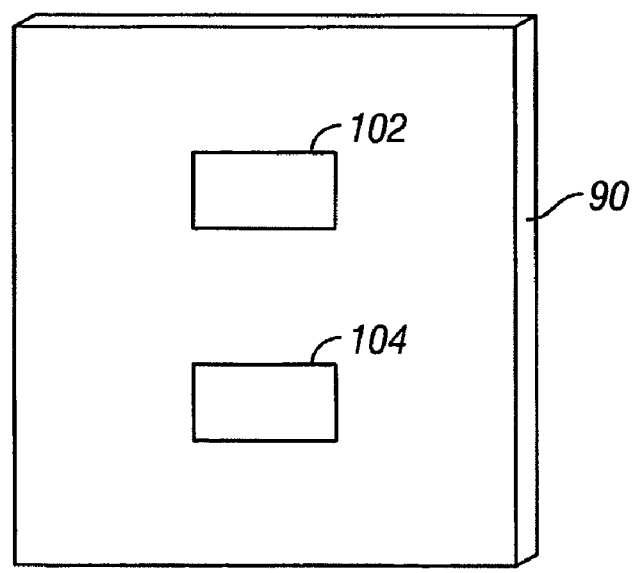
FIG. 11 is a diagram schematically illustrating light exit regions on a surface of a backlight.
Figure 12:
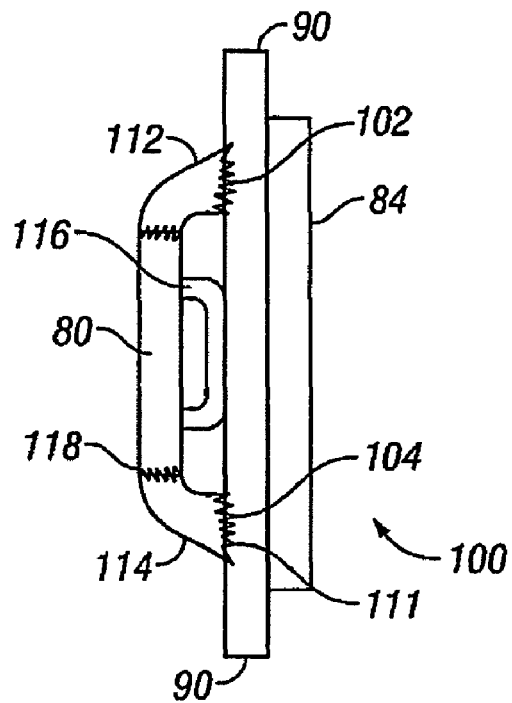
FIG. 12 is a cross section schematically illustrating a display device that includes a backlight configured to illuminate a reflective sub-display and a principle display that is transmissive.

FIGS. 11 and 12 illustrate an embodiment of a dual display 100 that includes a backlight 90 that provides light to a principle display 84 and a reflective sub-display 80 via first and second light pipes 112, 114. The aperture for the light leak regions 102, 104 in a backlight can vary in size and shape. In some embodiments, the light leak region can substantially match the size of the area of the sub-display 80, or substantially match the shape of the sub-display 80, or be larger than the size of the perimeter of the sub-display 80, as described in reference to FIG. 13. In addition, the number of apertures or light leak regions 102, 104 disposed on the backlight 90 can vary. A light leak may be created, for example, by removing portions of a reflective backing on the back of a backlight to create an aperture. In certain embodiments, an optically transmissive material may be placed in the aperture of the light leak region 102, 104. The light leak regions 102, 104 are not limited in location to the back of the backlight, they may be located in any region of the backlight which does not interfere with the lighting or viewing of the principle display 84. For example, in some embodiments, the light leak regions 102, 104 are disposed on the backlight 90 in the region behind the sub-display. In other embodiments, the light-leak regions may be placed on the backlight directly behind the sub-display and/or in a region above, below or to the side or sides of the area directly behind the sub-display (see, e.g., FIG. 11). In some embodiments light can exit the backlight through a side surface of the backlight 90 (not shown), or through a portion of the surface of the backlight 90 facing but not covered by the principle display 84.

As shown in FIG. 12, the light from the light leak regions 102, 104 can be provided to the sub-display 80 via an optical medium such as the first and second light pipes 112, 114. The dual display device 100 shown in FIG. 12, comprises a backlight 90 illuminating a principle display 84 that is disposed on one side of the backlight 90, and a sub-display 80 disposed on the opposite side of the backlight 90. The sub-display 80 shown in FIG. 12 includes a backplate 116 and is optically coupled to light pipes 112, 114. The light leak regions 102, 104 (FIG. 11) disposed on the side of the backlight 90 facing the sub-display 80 and in an area of the backlight not covered by the sub-display 80, can be covered by light pipes 112, 114 (FIG. 12) so that light propagates from the backlight 90 into the light pipes 112, 114. The light pipes 112, 114 are also coupled to a front surface edge of the sub-display 80. In some embodiments, the light pipes 112, 114 comprise material that is substantially optically transmissive such as, for example, polycarbonate or acrylic plastic materials. The light pipes 112, 114 can include, for example, a solid light guide that guides the light via total internal reflection (TIR). In some embodiments, the light pipes 112, 114 include a fiber optic such as a fiber optical bundle. In certain embodiments, the light pipes 112, 114 can also be hollow, and have reflective (e.g., metallized) surfaces to propagate light through the hollow region therein. Other designs of light pipes are also possible.

The light from the light source 90 can couple directly into the light pipe 112, 114. An emitting surface of the light source 90 can be disposed close to or possibly in contact with an input surface 111 of the light pipe 112, 114 to increase coupling efficiency. In the embodiment shown, the entrance 111 lies in the plane of the backlight 90, corresponding to the light leak region 104 of the backlight 90. In other embodiments, the light from the light source 90 can be coupled into the light pipe 112, 114 through an intermediate component or material.

This optically transmissive light piping 112, 114, is configured to propagate light from the backlight light source 90 to the sub-display 80, to for example, a side or a portion of a side of the sub-display 80 or to a surface or a portion of a surface of the sub-display 80. The light pipe also has an exit area 118 where light is output coupled and transferred from the light pipe 114 to the sub-display 80.

The sub-display 80 may include an optically transmissive substrate (for example, illustrated as substrate 20 in FIG. 1). As discussed more fully below in reference to FIG. 17, in some embodiments, the sub-display 80 can have a frontplate (for example, optical plate 152 in FIG. 17) disposed in front of the substrate. In various embodiments, the light pipe is optically coupled to the substrate and/or the front plate.

In the embodiment shown in FIG. 12, the exit face or aperture 118 is oriented generally perpendicular to the entrance face or aperture 111. This exit 118 may be disposed close to the edge of the frontplate and/or substrate of the sub-display 80. In this way, light that leaks from the backlight 90 is output coupled into the edge of the frontplate and/or substrate, either or both of which may optically guide the light therein.

In some embodiments, a single light pipe 112 provides light to the sub-display 80. In other embodiments, two or more light pipes 112, 114 provide light to the sub-display 80. In some embodiments, the light can enter the sub-display 80 at particular points. The light can be spread across the display 80 using various spreading or distribution techniques as discussed more fully below. Light can be provided to the sub-display 80 along one or more edges of the sub-display 80 by configuring one or more of the light pipes 112, 114 to contact the sub-display 80 along a portion of or all of the edge of the sub-display 80.

As described above, a light pipe may be configured to couple light from the backlight 90 to the substrate or to a frontplate disposed forward of the substrate. In some embodiments, the substrate or frontplate can include optical features that help to re-direct light to the light modulating element of the sub-display 80. For example, optical features on a surface of the substrate or a frontplate or in the substrate or frontplate may redirect light guided through the substrate or frontplate. In other embodiments where light is spilled onto the surface of the substrate or frontplate, optical features on the surface or in the substrate or frontplate can redirect light incident on the substrate or frontplate at grazing incidence, which would otherwise not be transmitted through the frontplate or substrate, to the light modulating element of the display. These optical features may comprise, for example, scatter features that scatter light or micro-optical elements including but not limited to mini-prisms and micro-lenses that redirect light. The optical features can comprise molded optics. Accordingly, the optical features may operate on the light in a deterministic or non-deterministic fashion. These optical features may comprise one or more surfaces that reflect or refract light (similar, for example, to those in a Fresnel lens or a corner turning film) to redirect the light toward the light modulating elements. The optical elements may be symmetric or asymmetric and may be periodic and/or non-periodic. Together the optical elements may form, for example a hologram or diffractive optical element or a diffuser. These optical elements need not be limited to surfaces features and may include volume features such as in a bulk diffuser or hologram. Accordingly, the light can be redirected using reflection, refraction, diffraction, diffusion, random or pseudo-random scattering techniques, or any combination thereof. Other configurations and approaches are also possible.

In embodiments where the light pipes 112, 114 couple light into the substrate, the optical couplings may provide index matching to reduce reflection at the interface between the light pipe and the substrate. In certain preferred embodiments, the exit port of the light pipes 112, 114 have a numerical aperture or entendue that substantially matches the numerical aperture or entendue of the substrate. In some embodiments, optical coupling provides a numerical aperture or entendue that matches that of the substrate. This optical coupling may, for example, alter the numerical aperture or entendue of the light pipe 112, 114 to substantially match that of the substrate. An imaging or non-imaging optical component may, for example, be used to achieve this conversion of numerical aperture or entendue. In some embodiments, the end of the light pipe 112, 114 is shaped and configured to provide this conversion.

Similarly, as described below, in embodiments where the light pipes 112, 114 couple light into an optical plate, sheet, layer, of thin film, the optical couplings may provide index matching to reduce reflection. Likewise, entendue may be substantially matched to increase or maximize throughput. In certain embodiments where the light pipes 112, 114 are coupled to both the substrate and one or more optical plate, sheet, layer, or film thereon, entendue may be substantially matched as well to increase throughput.

Figure 13A:
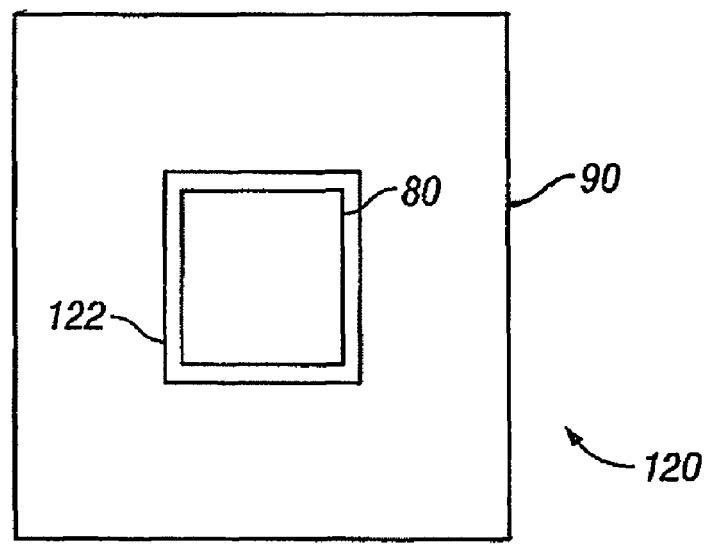
FIG. 13A schematically depicts a front view of an embodiment of a display device that includes a sub-display illuminated by a backlight through an annular light pipe that provides light to all sides of the sub-display.
Figure 13B:
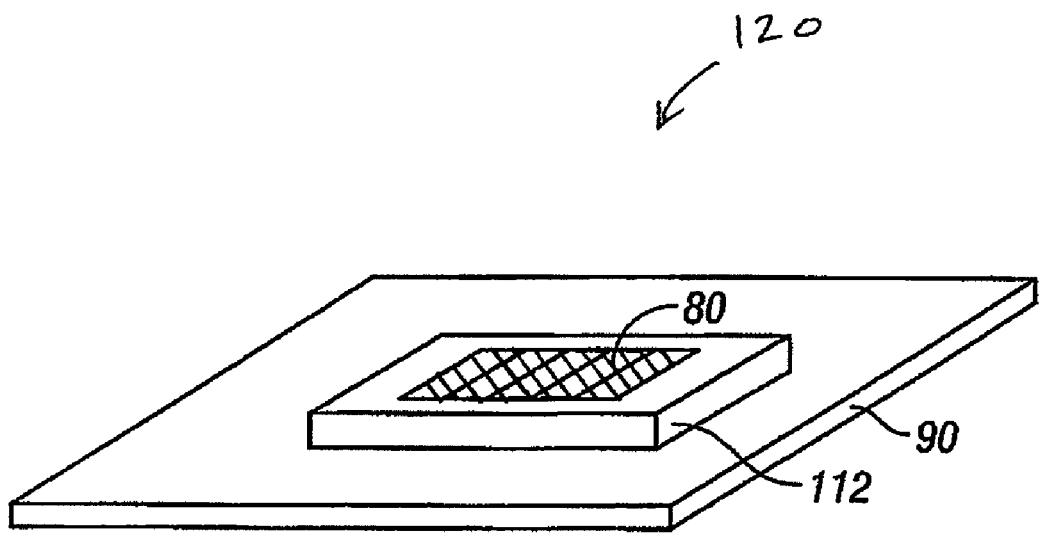
FIG. 13B schematically depicts a perspective view of the annular light pipe, backlight, and sub-display of FIG. 13A.
Figure 13C:
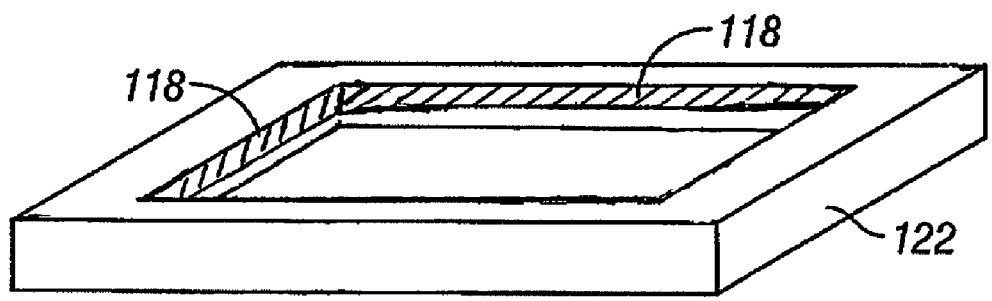
FIG. 13C schematically depicts a perspective view of the annular light pipe of FIG. 13A.

FIGS. 13A-C illustrate another embodiment of a display device 120 where an annular light pipe 122 provides light from the backlight 90 to the edges of the sub-display 80. FIG. 13A schematically depicts a front view of an embodiment of the annular light pipe 122 mounted on the backlight 90 with the sub-display 80 inserted in the center of the annular light pipe 122. In this configuration, light is provided by the backlight 90 to all sides of the sub-display through the annular light pipe 122. FIG. 13B schematically depicts a perspective view of the annular light pipe and backlight of FIG. 13A where the sub-display 80 is shown inset in the annular light pipe 122. FIG. 13C schematically depicts the annular light pipe of FIG. 13A without the sub-display 80 and illustrates the exit ports 118 of the annular light pipe.

The annular light pipe 122 has a light entrance (not shown) which could vary in size or location. In some embodiments, the entrance of the light pipe 122 has inner dimensions that are approximately the same shape and size, or slightly larger or smaller, as the outline of the sub-display 80. Additionally, the area of the entrance into the annular light pipe 122 can correspond with the shape and size of a light-leak region on the backlight 90. In the embodiment shown in FIGS. 13A and 13B, the annular light pipe 122 is shaped to conform and provide light to the four edges of the sub-display 80. The light pipe 122 is configured such that the exit portion 118 of the annular light pipe can propagate light into portions of the edges of the sub-display 80. The size of the entrance of the light pipe may vary and can have a cross-sectional area that is the same, larger or smaller than the cross-sectional area of the exit of the light pipe. Preferably, the entrance and exit of the light pipe are configured so light efficiently enters the light pipe 122, propagates through and exits the light pipe with reduced or minimal light loss. However, it is not required for all the light that is leaked from the backlight 90 to exit the light pipe 122 at exit portion 118. For example, some light that does not initially exit the light pipe through the light pipe exit may be recycled back through the light pipe and into the backlight 90. This recycled light may pass through the backlight 90 to illuminate the principle display or re-enter the light pipe 122 so as to ultimately illuminate the sub-display 80. As described above, the light pipe 122 may comprise a solid or hollow optical pipe or a fiber or fiber bundle, and other variations are also possible. The light pipe may comprise polymer material that can be molded, for example, by injection molding in some embodiments. Other methods of fabricating the annular light pipe 122 may be used. In some embodiments, the annular light pipe 122 can be configured to be an attachment device that secures the sub-display 80 in the display device 120 and is optically coupled to the sub-display 80.

Figure 14:
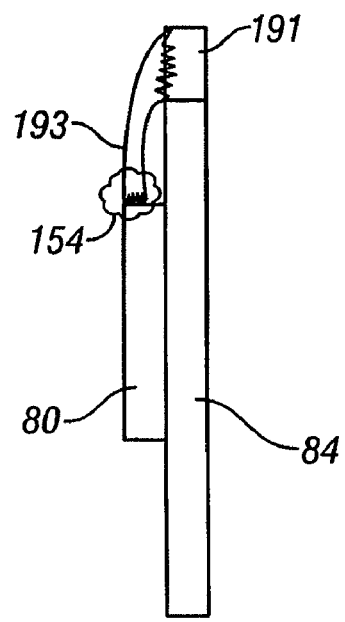
FIG. 14 is a cross sectional view schematically illustrating an embodiment of a display device having a backlight that illuminates a reflective display using a light pipe.

There are numerous alternative implementations for illuminating a dual display with a single backlight. For example FIG. 14 illustrates illumination of a dual display device with the back of principle display 84 facing the back of the sub-display 80, wherein the principle display 84 is illuminated from a light source 191 at the edge of the principle display 84. The sub-display 80 is illuminated at the edge of the display from the same light source 191 through a light pipe 193. The light pipe 193 is optically coupled 154 to the edge of the sub-display 80 to disperse the light evenly throughout the sub-display 80. In this embodiment, optical coupling 154 couples the light pipe 193 to the sub-display 80. The principle display 84 can be any type of display that is configured to be illuminated on the edge of the display. In some embodiments, the sub-display 80 and/or the principle display 84 have scattering features or other optical structures disposed on or forward of the display, for example, on a surface between the viewer and the reflective light modulating portion of the sub-display 80 or the principle display 84.

Figure 15:
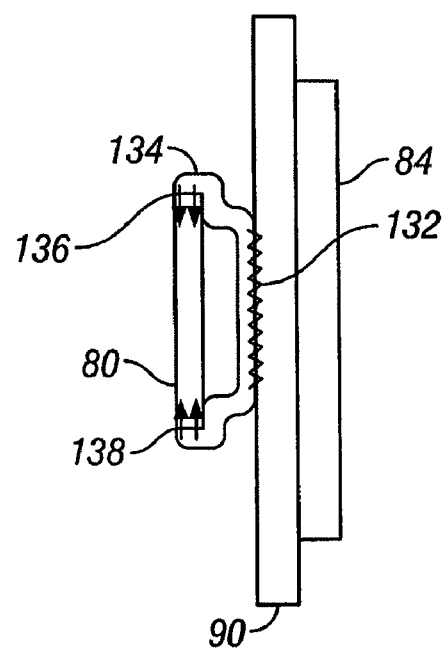
FIG. 15 is a cross sectional view schematically illustrating an embodiment of a display device that includes a backlight that provides illumination to a sub-display via a backplate configured as a light pipe.
Figure 16:
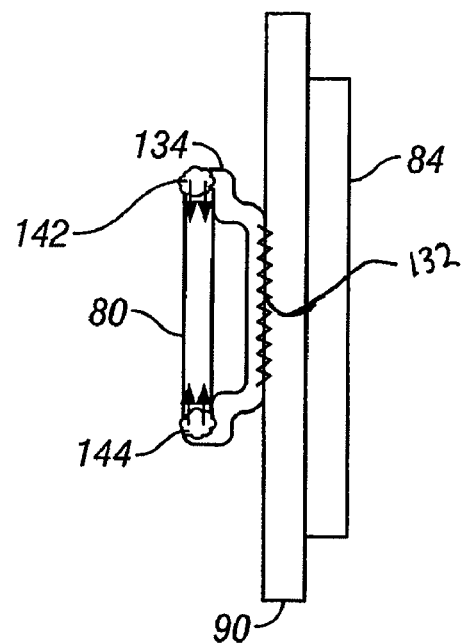
FIG. 16 is a cross sectional view schematically illustrating an embodiment of a display device that includes a backlight that provides illumination to a sub-display via a backplate configured as a light pipe and optical coupling material.

Additionally, the backplate of the sub-display can be used as part or all of the light pipe. In some embodiments, the light-leak from the backlight can, for example, comprise an area defined by the area of the sub-display, e.g., essentially square or rectangular. Two examples are shown in FIGS. 15 and 16 where areas of light transfer are indicated by hatching at the light entrance 132. Referring to FIG. 15, the backplate 134 of the sub-display 80 can be modified to operate as the light pipe. In some embodiments where the backplate 134 serves as a light pipe, the backplate may have similar features to the light pipes 112, 114 and annular light pipe 122 discussed above. For example, the backplate 134 may comprise optically transmissive material through which light can propagate. The backplate 134 may, for example, comprise polymeric material that is molded or formed into a suitable shape, e.g., to surround and hold the sub-display 80 and to optically couple to the light leakage region 132. In certain embodiments, the backplate may include a hollow region through which light may propagate. Additionally, the backplate may be optically coupled to the sub-display 80, or coupled to a sheet, plate, or film proximal to the display, for example, through an optical cement.

The backplate 134 may be disposed about the display 80 to produce a cavity between the display and backplate. The backplate 134 of the sub-display 80 is configured as a light pipe that receives light through a light entrance 132 and propagates the light to the front edge of the sub-display 80, where the light exits the backplate/lightpipe 134 through the light exits 136, 138 and enters the sub-display 80. Similar to the light pipes 114 in FIGS. 12 and 13, the backplate 134 can be configured in various ways to provide light to a portion of the edge or the entire edge of the sub-display 80.

Referring now to FIG. 16, the backplate 134 can be extended beyond the edges of the sub-display 80, and disposed such that the light exit area of the backplate 134 is near the edge of the sub-display 80. In some embodiments, optical couplings 142, 144 can be used to optically bridge any gap that exists between the light exit area of the backplate 134 and the sub-display 80. The optical coupling 142, 144 can be, for example, a small light pipe or optical coupling adhesive. The optical couplings 142, 144 may include reflective surfaces therein to direct light from the backplate 134 into the display. In this way, the combination of the backplate 134 and the optical couplings 142, 144 serves as the light pipe that provides light from the backlight 90 to the sub-display 80.

Figure 17:
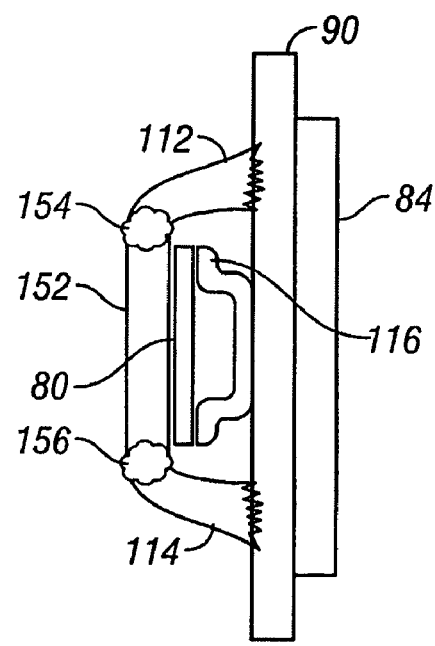
FIG. 17 is a cross sectional view schematically illustrating an embodiment of a display device that includes a substantially optically transmissive component disposed forward of a reflective display.

FIG. 17 shows a substantially optically transmissive component 152 disposed forward of the sub-display 80. In some embodiments, the substantially optically transmissive component is an optical plate, and in the discussion of an embodiment hereinbelow, the substantially optically transmissive component will be referred to as optical plate 152. In other embodiments, the substantially optically transmissive component is an optical sheet, film or layer. In some embodiments, the substantially optically transmissive component comprises a light guide. Accordingly, the discussion provided herein with respect to the optical plate 152 may also apply to optical sheets, films, and layers as well.

The light pipe 112, 114 may be configured to couple light from the backlight 90 to the optical plate 152 disposed forward of the sub-display 80 (for example, between the sub-display 80 and a viewer of the sub-display 80). In some embodiments, the optical plate 152 can include optical features that help to re-direct light to the light modulating element of the sub-display 80. For example, optical features on a surface of the optical plate 152 or in the optical plate 152 may redirect light guided through the optical plate 152, e.g., by total internal reflection. In other embodiments where light is spilled onto the surface of the optical plate 152, optical features on the surface or in the optical plate 152 can redirect light incident on the optical plate 152 at or near grazing incidence. This redirected light, which would otherwise not be transmitted through the optical plate 152, is made to impinge upon and illuminate the light modulating elements of the display. These optical features may comprise, for example, scatter features that scatter light or micro-optical elements including but not limited to mini-prisms and micro-lenses that redirect light. The optical features can comprise molded optics. Accordingly, the optical features may operate on the light in a deterministic or non-deterministic fashion. These optical features may comprise one or more surfaces that reflect or refract light (similar, for example, to those in a Fresnel lens or a corner turning film, e.g., a variation of the quarter turning film by 3M Corporation) to redirect the light toward the light modulating elements. The optical elements may be symmetric or asymmetric and may be periodic and/or non-periodic. Together the optical elements may form, for example a hologram or diffractive optical element or a diffuser. These optical elements need not be limited to surfaces features and may include volume features such as in a bulk diffuser or hologram. Accordingly, the light can be redirected using reflection, refraction, diffraction, diffusion, random or pseudo-random scattering techniques, or any combination thereof. Other configurations and approaches are also possible.

The optical plate 152 may comprise, for example, glass or plastic or any substantially optically transmissive (or transparent) material. In some embodiments, the optical plate 152 comprises an optical sheet, film or layer. Such an optical sheet, film, or layer, may also comprise, e.g., glass or polymer or other substantially optically transmissive material. In some embodiments, an optical film 152 is laminated to the substrate on which the spatial light modulator elements are formed on one or more layers thereon. In other embodiments, the optical film 152 can be grown or may be formed in other ways, for example, optical structures may be molded directly onto the sub-display as a permanent or removable optical film.

The optical plate 152 can be optically coupled to the light pipes 112, 114 by a variety of techniques. For example, optical adhesive or other coupling material may be used as optical coupling 154, 156, or the light pipe 112, 114 may be near or touching the optical plate 152. The optical coupling 154, 156 may provide index matching to reduce reflection at the interface between the light pipes 112, 114 and the optical plate 152. In certain preferred embodiments, the exit port of the light pipes 112, 114 have a numerical aperture or entendue that substantially matches the numerical aperture or entendue of the optical plate 152. In some embodiments, optical coupling 114, 156 provides a numerical aperture or entendue that matches that of the optical plate 152. This optical coupling may, for example, alter the numerical aperture or entendue of the light pipe to substantially match that of the optical plate 152. An imaging or a non-imaging optical component may, for example, be used to achieve this conversion of numerical aperture or entendue. In some embodiments, the ends of the light pipes 112, 114 are shaped and configured to provide this conversion.

The optical plate 152 may be configured to disperse the light from the light pipes 112, 114 evenly throughout the sub-display surface. In some embodiments, the backplate 116 comprises a light pipe that couples light into the optical plate 152.

Figure 18:
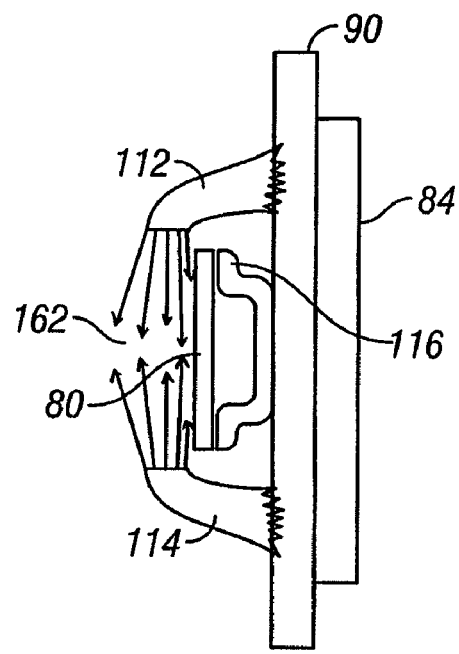
FIG. 18 is a cross sectional view schematically illustrating an embodiment of a display device illuminated by light spilled on a front surface of the display.

FIG. 18 illustrates an embodiment where the light pipes 112, 114 spill the light 162 onto the sub-display 80 or onto an optical plate (sheet, film, or layer, etc.), such as the optical plate 152 shown in FIG. 17. The shape of the light pipe and the shape of the exit regions can be tailored to distribute light in a controlled manner. In some embodiments, the sub-display 80 or optical plate 152 may be configured to disperse the light throughout the display. Optical features may be used to re-direct light toward the light modulating elements, as discussed above. See, for example, discussion of FIG. 17 an associated discussion.

Figure 19:
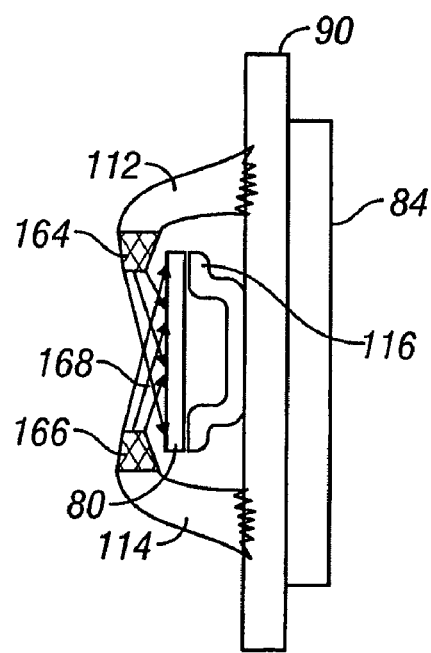
FIG. 19 is a cross sectional view schematically illustrating an embodiment of a display device illuminated by light distributed in a controlled manner on a front surface of the display.

FIG. 19 illustrates an embodiment where the light pipes 112, 114 further comprise distal portions 164, 166 configured to control the distribution of light, e.g., distribute light 168 onto the sub-display 80 in a pre-determined pattern. In some embodiments, the distal portion 164, 166 of the optical pipes 112, 114 can be structured to mimic edge lighting with LEDs. Knowledge of the pattern of the structured spill allows the sub-display 80 to be configured so as to disperse the light evenly throughout the display with, for example, optical features in the display, one or more optical plates 152 (or sheets, films, or layers) as discussed with reference to FIG. 17. The distal portion 164, 166 of the optical light pipes 112, 114 can be separate components optically coupled to the light pipes 112, 114, or the distal portions 164, 166 may be integrated as part of the light pipes 112, 114.

Figure 20:
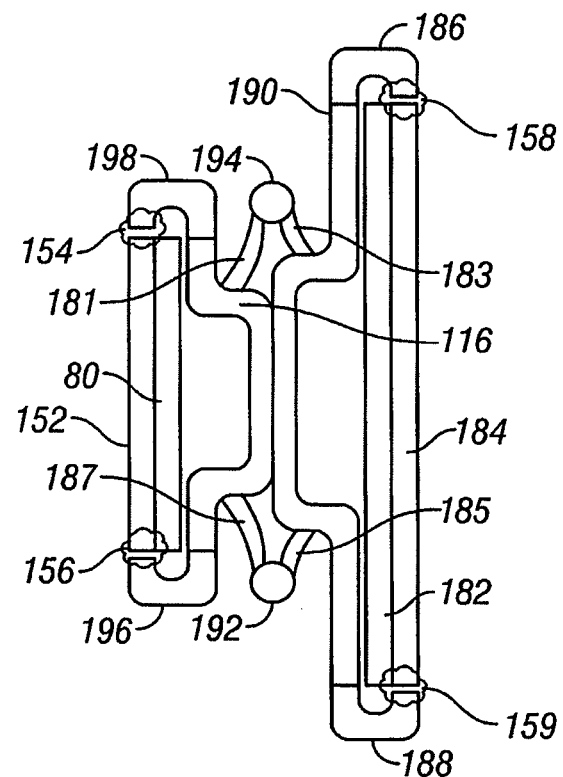
FIG. 20 is a cross sectional view schematically illustrating an embodiment of a display device having first and second backplates that channel light to first and second reflective displays, respectively.

The embodiments described herein relate not only to providing light to a sub-display by a dual display light source, but also to providing light to the principle display. For example, if the principle display is a reflective display that cannot receive light through its back surface that faces the backlight, the above-described light pipes and backplate configurations for the sub-display can be utilized to illuminate the principle display. For example, FIG. 20 illustrates a dual display outfitted with first and second light sources 192, 194 disposed between the sub-display 80 and a principle display 182. Light pipes 181, 183, 185, 187 optically couple the light sources 192, 194 to the backplates 116, 117, which are also light guides. The light is further funneled by additional optical pipes 186, 188, 196, 198 to the displays 80, 84. In FIG. 20, the additional optical pipes 186, 188, 196, 198 are optically coupled to an optical film or plate 174, 184 disposed forward at the displays 80, 84.

The optical films or plates 174, 184 may comprise optical features to redirect light toward the light modulating elements as discussed above. Also, as discussed above, the light pipes 186, 188, 196, 198 and optical plate 152, 184 may be optically coupled in a manner that increases the transfer of light. However, in some embodiments the additional optical pipes 181, 183, 185, 187, 186, 188, 196, 198 and/or optical plates or films 174, 184 are not used, and the backplates 116, 117 are configured to propagate the light from light sources 192, 194 either throughout the displays 80, 182 or to the edge of the displays which may comprise scatter features. Similarly, light may be coupled by light pipes into the substrate in addition to or instead of the optical films or plates 174, 184. A wide range of variations in configuration and designs such as discussed above and elsewhere herein may be employed. For example, The display device of claim 30, wherein the light piping comprises a single backplate that provides light to both the first and second displays. Still other variations are possible as well.

As described above, dual display devices can include features that re-direct (e.g., scatter) light to the reflective display. Such features may comprise, for example, illumination dots, described in the commonly owned patent application entitled "Integrated Modulator Illumination," U.S. patent application Ser. No. 10/794,825.

Figure 21:
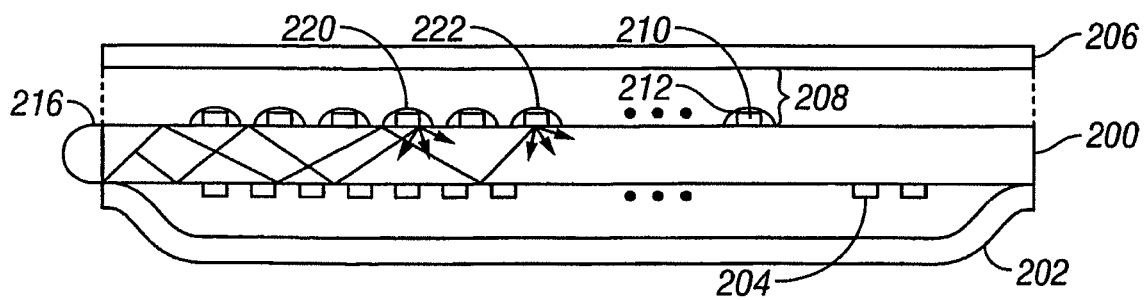
FIG. 21 schematically depicts an example of a spatial light modulator having scatter features or illumination dots.

An embodiment of a purely reflective display comprising a spatial light modulator having illumination dots is shown in FIG. 21. The spatial light modulator in this example comprises interferometric modulators such as described above used as part of the dual display device. A diffuser 206 is disposed forward of the spatial light modulator. The interferometric modulator shown in FIG. 21 is formed on an optically transmissive substrate 200. Each element 204 of the spatial light modulator array can be individually activated to modulate the light that travels through the diffuser 206 and through the substrate 200 to reach the element 204. Each modulator element, when activated, can be used to direct modulated or non-modulated light to a viewer 214 on the opposite side of the substrate 200. This embodiment includes a backplate 202 for the modulator that can be opaque, rendering this type of modulator difficult to use with backlighting. The elements 204 are themselves opaque, which makes backlighting even more difficult.

With application of an edge lighting scheme as described herein for a dual display application, illumination dots 208 formed at the interface between the diffuser 206 and the substrate 200 can provide illumination for the display. Each dot 208 is comprised of a first layer 210 that is reflective disposed towards the modulator array and a second layer 212 that is absorbing disposed towards the viewer 214. The illumination dots may be formed on the surface of the optically transmissive substrate 200 or on the diffuser 206 (or on one or more layers formed or coupled thereon, e.g., an optical plate 152) by various types of printing or thin film deposition techniques. Other methods of forming the optical features may also be employed.

The illumination dots together with a light source associated with the display can supplement ambient light, increasing the brightness of the display. In total darkness, the illumination dots and the associated light source can provide all necessary illumination for the display. FIG. 21 shows a light source 216, such as a cold cathode fluorescent tube or a light emitting diode (LED), residing at one edge of the optically transmissive substrate 200. An some embodiments, an edge emitting light pipe illuminated, e.g., by a LED, may instead be employed as the light source 216. Light emitted by the light source 216 and properly injected into the substrate 200 propagates through the substrate guided therein by total internal reflection. As illustrated, light striking an illumination dot is reflected in several different directions; see, e.g., at dots 220 and 222. As described above, in some embodiments, the light source 216 in FIG. 21 can be a light pipe that illuminates the edge of the display, or that illuminates an optical plate, sheet, film, or layer forward of the display.

Figure 22:
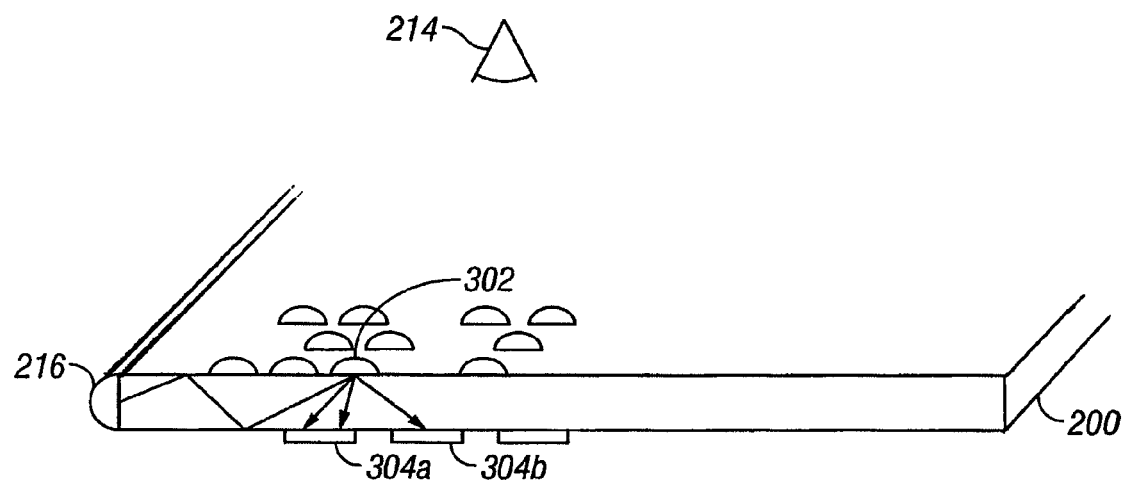
FIG. 22 schematically depicts an embodiment of an illumination dot pattern used with a backlight.

The dots can be configured and arranged depending, for example, upon the type and distribution of the illumination and the environment in which the modulator may be used as well as the design of the spatial light modulator. FIG. 22 shows an example of a dot pattern that is not uniform. In various embodiments, the dot arrangement may vary in many aspects and may be, for example, irregular. The degree of regularity of the arrangement of dots may range from completely random, to partially random and partially regular to uniform and periodic. The arrangement may be selected to reduce Moire effects that result from the periodicity of the light modulating elements in the modulator array or to reduce fixed pattern noise. Also, as discussed above, the dots can be arranged to distribute the light in a particular fashion, for example, evenly across the display for a given illumination configuration. Dots in the dot pattern, such as dot 302, deflect or scatter light which subsequently strikes modulator elements such as elements 304a and 304b. The light deflected or scattered from dot 302 may have been internally reflected several times within substrate 200 before striking dot 302 and being deflected or scattered.

As discussed above, light injected into the optically transmissive substrate 200 is internally reflected in the substrate 200. Without dots or some other perturbing structure this light may continue to traverse the substrate 200. The dots disrupt or perturb the propagation of the light within the substrate 200 scattering the light onto the spatial light modulator elements 304. The dots may be arranged in a pattern to provide for a specific distribution of light on the spatial light modulator array. In some embodiments, for example, the dot pattern can create uniform illumination on the array of spatial light modulator elements.

In various embodiments, the dots will be of a size too small to resolve by the vision of a human observer viewing the display at a normal viewing distance. Undesirable artifacts can sometimes still be created by arrays with features that are not individually resolvable. The pattern can be such that these undesirable artifacts are mitigated or eliminated. As described above, the pattern can also control the distribution of the light on the spatial light modulators.

Figure 23:
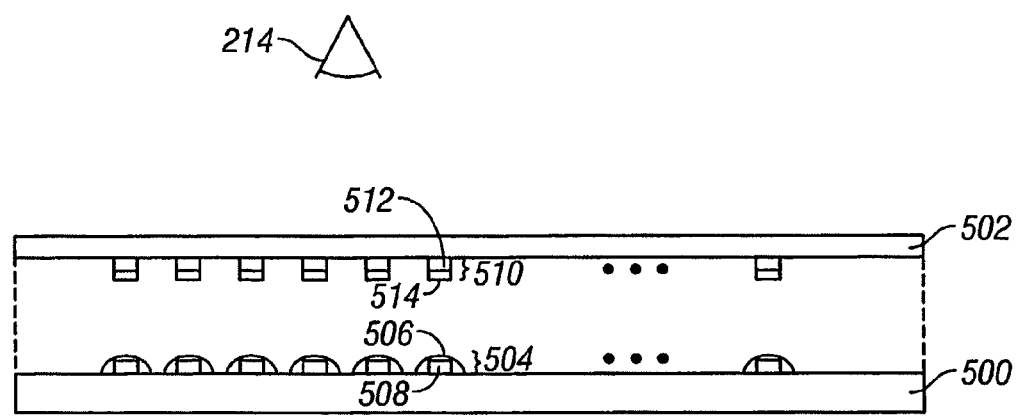
FIG. 23 schematically depicts embodiments of possible positions for the array of illumination dots.

In addition to variation in the patterning of the dots, the surface upon which the dots are placed may also be varied. In FIG. 23, the dots are shown at the interface between the diffuser 502 and the optically transmissive substrate 500. The diffuser 502 is mated to the optically transmissive substrate 500 in certain embodiments. For purposes of FIG. 23, the diffuser has been lifted away from the substrate 500. The dots could be patterned onto the surface of the substrate 500, such as dot 504. Dot 504 has a reflective portion 508 towards the modulator array, not shown, and an absorbing portion 506 towards the viewer 214.

In an alternative embodiment, the dots can be placed on the surface of the diffuser 502, such as dot 510. The dots can also be formed on one or more layers on the diffuser 502 or substrate 500 or can be formed elsewhere (e.g., on an optical plate disposed between the reflective display and a viewer of the display). Changing the position of the dots may modify the dot processing sequence. A dot on the surface of the substrate, such as 504, may have a first reflective material 508 deposited and then covered by an 'overcoat' 506 of absorbing material. If the dots reside on the surface of the diffuser 502, such as 510, the absorbing material 512 may be put down first, followed by the reflective material 514. This approach maintains the proper orientation of the layers with regards to the modulator and the viewer 214.

The optical features can be located elsewhere. For example, the optical features may be disposed on the surface of an optical plate (sheet, film, or layer). The optical features may also be disposed in the substrate or optical plate (sheet, film, or layer). Still other variations are possible.

Although dots having a specific shape and configuration are shown in FIGS. 21-23, other types of features may be used in the substrate of the sub-display or an optical plate, sheet or film forward the sub-display. These features may, for example, comprise microstructures or microstructure arrays comprising, e.g., bumps, dots, or pits. The features may comprise concave or convex surfaces (e.g., that form lenses or lenlets). In some embodiments, the features are elongated and comprise, e.g., ribs, ridges, or grooves, that may or may not be straight. Tilted and curved surfaces may be used as well. A wide range of other shapes, geometries, and configurations are possible. In some embodiments, the geometries may deterministically redirect the light into the display. As described above, for example, micro-optics such as micro-lenses, prisms, and corner turning films may be used. The features may, for example, redirect light disposed at any angle on the surface of the display to fold into the display for proper illumination. Non-deterministic approaches may be employed. The optical features may comprise features that form a diffuser, a diffractive optical element, or a hologram.

These features may have regular or irregular shape and may have different dimensions. The features may comprise opaque or substantially optically transmissive material. The features may be partially or completely reflective, transmissive, and/or absorbing. The features may comprise metal in some embodiments or may comprise dielectric. The features may comprise dielectric having an index of refraction that is the same or different than the surface (e.g., substrate, diffuser, optical plate, other layers etc.) on which the features are formed. Some microstructure arrays can have dimensions on the order of microns.

The features can be fabricated in different ways as well. The features can be applied, for example, by printing or lithographically, by injection molding or laser etching. The features can be applied onto a surface as a film. In an alternative embodiment, light scattering and/or directing microstructures can be manufactured and bonded onto a surface of the display, optical film or plate using resin which is molded and cured to form a desired microstructure, for example using ultraviolet-setting resin. Other methods of fabricating the scattering features are also possible.

Figure 24:
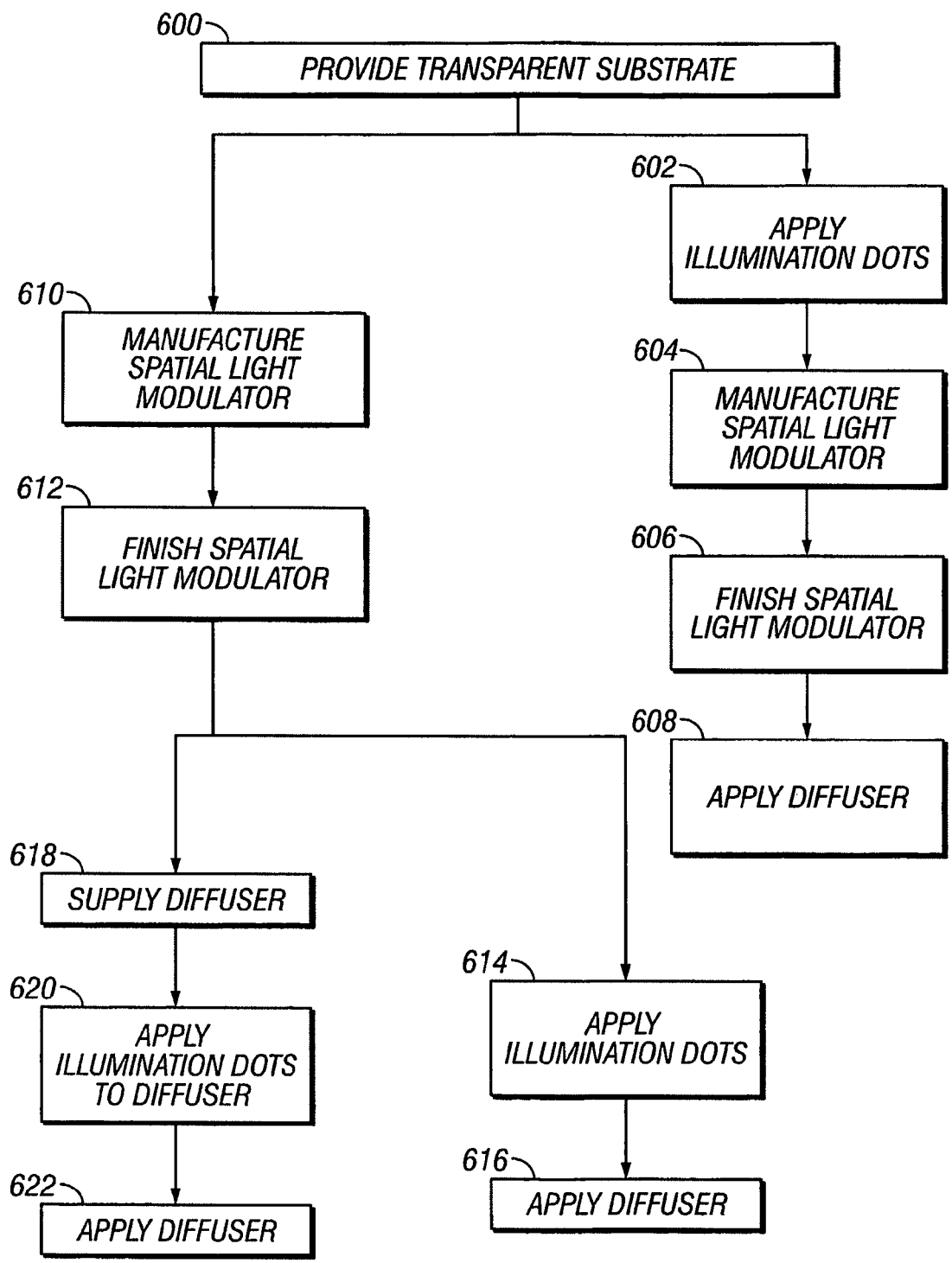
FIG. 24 is a flow chart showing different methods for manufacturing a spatial light modulator with illumination dots.

In addition to the flexibility in forming the optical features on a variety of surfaces of the display and the flexibility as to what pattern and density the optical features are formed, there is also considerable flexibility as to the point in a manufacturing process at which the optical feature are created. Some exemplary methods for manufacturing spatial light modulator arrays with illumination dots are shown in FIG. 24.

In one embodiment, the process starts with providing a substantially optically transmissive substrate at block 600. The illumination dots are applied to the optically transmissive substrate or any optical plate, sheet or film 152 forward of the display at block 602. The spatial light modulator is manufactured at block 604. The modulator is finished at block 606, which may include such tasks as attaching a backplate. The diffuser is applied to the substrate or any optical plate 152, forward the display, over the illumination dots, at block 608. Other components may also be included.

In an alternative embodiment, the spatial light modulator is manufactured on the 'back side' (away from the viewer) of the substantially optically transmissive substrate at block 610. The spatial light modulator is finished at block 612. In one embodiment, the illumination dots are applied to the front side of the substrate at block 614 and the diffuser is applied at block 616.

In another alternative, a diffuser is supplied at block 618 either after the modulator is finished at block 612 or in parallel with the process of manufacturing and finishing the modulator. The illumination dots are applied to the diffuser at block 620 and the diffuser is applied to the substrate at block 622.

Other methods may also be used. No order is implied by the listing the processes, as the order may change depending upon the embodiment. Additionally, processing steps may be added or removed.

As described above, the optical features may be formed in one of many printing procedures, including, e.g., lithographic printing, inkjet printing, screen-printing or any other type of printing technique. Non-printing based methods may also be used. The optical features can, for example, be embossed onto the surface or molded. The optical features may be formed on a surface that is laminated or adhered to the substrate or optical plate or other layer. Still other techniques, including both those well known in the art as well as those yet to be devised may be employed. The shape and configurations of the optical features may be controlled to increase or maximize effectiveness. As mentioned above, the optical features can be fabricated at a resolution below the resolution of the human eye to avoid affecting the image quality as seen by the viewer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed:

1. A display device comprising:
a first display, said first display being reflective;
a light source disposed rearward of said first display;
one or more first light guides disposed to receive light from said light source; and
one or more second light guides disposed forward of said first display, wherein the one or more first light guides are optically coupled to the one or more second light guides such that light emitted by the one or more first light guides is directed into said one or more second light guides, to provide front illumination to said first display.

2. The display of claim 1, further comprising a second display positioned such that said light source is disposed rearward of said second display, wherein said light source provides illumination to said second display.

3. The display of claim 1, wherein said one or more first light guides comprises a backplate disposed rearward of said first display.

4. The display of claim 1, wherein said one or more second light guides comprises an optical plate, sheet, or film.

5. The display of claim 1, wherein said one or more second light guides comprises a substrate of the first display.

6. The display of claim 1, wherein said first display comprises a plurality of light modulating elements.

7. The display of claim 6, wherein said plurality of light modulating elements comprises a plurality of interferometric modulators.

8. The display of claim 1, wherein said one or more second light guides includes optical features configured to redirect said light coupled therein to said first display.

9. The display of claim 8, wherein said optical features include mini-prisms, micro-lenses, a hologram, a diffractive optical element, or a diffuser.

10. The display device of claim 1, further comprising:
a processor in electrical communication with said first display, said processor configured to process image data; and
a memory device in electrical communication with said processor.

11. The display device of claim 10, further comprising a driver circuit configured to send at least one signal to said first display.

12. The display system of claim 11, further comprising a controller configured to send at least a portion of said image data to said driver circuit.

13. The display of claim 1, wherein the light source comprises an optically reflective surface having one or more light leak apertures configured to leak light, and wherein the one or more first light guides are disposed to receive light from the light leak apertures.

14. The display of claim 13, wherein the light source extends across a portion of a back of the first display, wherein the light source comprises a surface facing towards the first display, and wherein the one or more light leak apertures are located on the surface facing towards the first display.

15. The display of claim 14, wherein the light source comprises a major surface extending across a portion of the back of the first display and a minor surface, wherein an area of the major surface is larger than an area of the minor surface, and wherein the major surface of the light source is the surface facing towards the first display.

16. The display of claim 13, wherein the light source comprises light control patterns that are configured to compensate for the light leaked by the one or more light leak apertures to produce a substantially uniform light distribution across a length of the light source.

17. A method of manufacturing a display device, the method comprising:
providing a first display, said first display being reflective;
providing a light source disposed rearward of said first display;
providing one or more first light guides disposed to receive light from said light source; and
providing a second light guide forward of said first display, such that the one or more first light guides are optically coupled to the second light guide such that light emitted by the one or more first light guides is directed into said second light guide, to provide front illumination to said first display.

18. The method of claim 17, further comprising providing a second display such that said light source is disposed rearward of said second display, wherein said light source provides illumination to said second display.

19. The method of claim 17, wherein said one or more first light guides comprises a backplate disposed rearward of said first displaying means.

20. The method of claim 17, wherein said second light guide comprises an optical plate, sheet, or film.

21. The method of claim 17, wherein said second light guide comprises a substrate of the first display.

22. The method of claim 17, wherein said first display comprises a plurality of light modulating elements.

23. The method of claim 22, wherein said plurality of light modulating elements comprises a plurality of interferometric modulators.

24. The method of claim 17, wherein said second light guide includes optical features configured to redirect said light coupled therein to said first display.

25. The method of claim 24, wherein said optical features include mini-prisms, micro-lenses, a hologram, a diffractive optical element, or a diffuser.

26. The method of claim 17, wherein the light source comprises an optically reflective surface having one or more light leak apertures configured to leak light, and wherein the one or more first light guides are disposed to receive light from the light leak apertures.

27. The method of claim 26, wherein the light source extends across a portion of a back of the first display, wherein the light source comprises a surface facing towards the first display, and wherein the one or more light leak apertures are located on the surface facing towards the first display.

28. The method of claim 27, wherein the light source comprises a major surface extending across a portion of the back of the first display and a minor surface, wherein an area of the major surface is larger than an area of the minor surface, and wherein the major surface of the light source is the surface facing towards the first display.

29. The method of claim 26, wherein the light source comprises light control patterns that are configured to compensate for the light leaked by the one or more light leak apertures to produce a substantially uniform light distribution across a length of the light source.

* * * * *